US008675863B2

(12) United States Patent
Anderson

(10) Patent No.: US 8,675,863 B2
(45) Date of Patent: Mar. 18, 2014

(54) PASSIVE SYSTEM FOR RECOVERING CRYPTOGRAPHY KEYS

(75) Inventor: Robert J. Anderson, Phoenixville, PA (US)

(73) Assignee: TruePosition, Inc., Berwyn, PA (US)

( * ) Notice: Subject to any disclaimer, the term of this patent is extended or adjusted under 35 U.S.C. 154(b) by 995 days.

(21) Appl. No.: 12/645,123

(22) Filed: Dec. 22, 2009

(65) Prior Publication Data

US 2011/0150211 A1    Jun. 23, 2011

(51) Int. Cl.
*H04L 9/00*      (2006.01)
*H04L 29/06*     (2006.01)
(52) U.S. Cl.
CPC ..................................... *H04L 63/30* (2013.01)
USPC ............................... 380/1; 380/286; 380/270
(58) Field of Classification Search
USPC ............................................................. 380/1
See application file for complete search history.

(56) References Cited

U.S. PATENT DOCUMENTS

| | | | |
|---|---|---|---|
| 6,671,507 B1 | 12/2003 | Vinck | |
| 6,738,902 B1* | 5/2004 | Ruppert et al. | 713/162 |
| 7,441,271 B2* | 10/2008 | Fiatal et al. | 726/22 |
| 7,574,599 B1 | 8/2009 | Zhang | |
| 2004/0230824 A1 | 11/2004 | Heil | |
| 2005/0050316 A1* | 3/2005 | Peles | 713/151 |
| 2006/0030333 A1 | 2/2006 | Ward et al. | |
| 2006/0072550 A1* | 4/2006 | Davis et al. | 370/352 |
| 2007/0297418 A1* | 12/2007 | Lee | 370/395.52 |
| 2008/0020756 A1* | 1/2008 | Jiang | 455/432.1 |
| 2008/0261611 A1 | 10/2008 | Mia et al. | |
| 2008/0311891 A1* | 12/2008 | Venkatachalam et al. | 455/414.1 |
| 2009/0182668 A1* | 7/2009 | Lee | 705/50 |
| 2009/0220091 A1 | 9/2009 | Howard | |
| 2010/0013633 A1* | 1/2010 | Hazzani | 340/540 |

OTHER PUBLICATIONS

International Patent Application No. PCT/US2010/061235: International Search Report dated Apr. 6, 2011, 3 pages.
Global System for Mobile Communications, 3GPP Release 7.0 Technical Specification No. 48.0711, "*Location Services (LCS); Serving Mobile Location Centre—Base Station System (SMLC-BSS) interface; Layer 3 specification*" Section 4.2.12 (U-TDOA Response), 2006, 21 pages.

* cited by examiner

*Primary Examiner* — Matthew Henning
(74) *Attorney, Agent, or Firm* — Baker & Hostetler LLP

(57) ABSTRACT

Modern cellular wireless communications providers strive to keep their network and subscribers secure through various means. The identity of the subscriber may be obfuscated through the use of a temporary identifier for most network transactions including signaling events, voice calls, SMS messages and data sessions. A subscriber's unique identity may only be transmitted over the air in an encrypted form. Similarly, the content of voice calls, SMS messages and data sessions may also be encrypted when transmitted over the air and even when transferred over internal network interfaces. However, the use of encryption presents significant challenges for law enforcement communities when court ordered lawful intercept is required to monitor and locate subscribers utilizing the wireless networks for illegal and/or terrorist purposes. A technique to aid in the determination of a subscriber's unique wireless identity and the decryption of encrypted signals would be very useful for lawful intercept. In this document we describe an architecture and technique to aid in the decryption of encrypted wireless signals for lawful intercept by determining the current encryption key. It may also be used to decrypt encrypted signals on internal interfaces of the wireless and wireline networks.

16 Claims, 12 Drawing Sheets

PASSIVE SYSTEM FOR RECOVERING CRYPTOGRAPHY KEYS

TECHNICAL FIELD

The present invention relates generally to methods and apparatus for collecting and deciphering of encrypted wireless signals for lawful intercept by passively determining the current encryption key. More particularly, but not exclusively, the present invention relates to the decryption of encrypted signals on internal interfaces of the wireless and wireline networks.

BACKGROUND

The present invention usage and need are deeply rooted in the security design of the Global System for Mobility (GSM) and its successors, the Universal Mobile Telephone System (UMTS) and the Long Term Evolution (LTE) wireless networks.

Description of GSM Security

Wireless GSM networks are very secure because they were designed with security in mind given the then (The original design for GSM was engineered over the period 1987 to 1991) bifurcation of Europe into the Eastern and Western blocs.

The first level of security is obfuscation of the user's identity by substituting a Temporary Mobile Subscriber Identity (TMSI) for the user's actual, unique identity, i.e. the IMSI. Thus, when a subscriber first powers up his GSM mobile in a network, where he has not been before his IMSI will be transmitted over the air interface in the clear, i.e. not encrypted, during the power up registration procedure. This will register this subscriber into the VLR of that network, whether it is his home network or not. Once in the network's VLR, the subscriber will be assigned a TMSI which will be used as his identifier for all subsequent network transactions. His TMSI will change as he moves about the geographic area of the network, but the VLR will always maintain this dynamic relationship between the TMSI and IMSI. The second level of security in GSM networks is the authentication process. All requests by the mobile for use of the network's resources will be challenged with an authentication process to verify that the subscriber is the subscriber he says he is, has permission to use the requested resources and is in good standing with the wireless carrier. The GSM authentication process requires the mobile to exchange data over the air interface. Early in this authentication process the network and the mobile exchange information to enable encryption of any subsequent data that is exchanged. The encryption algorithm utilized in the authentication process is generally the same across GSM networks worldwide but can be unique to specific GSM providers.

The third level of security in GSM networks occurs after a subscriber has been authenticated. Once authenticated, all over-the-air communications between the mobile and network will be encrypted to hide the subscriber's unique identity, i.e. IMSI, hide his network transactions and to prevent eavesdropping on the conversation. This encryption algorithm is universal across GSM networks worldwide which permits subscribers to "roam" on networks other than their home one. Although the level of security in GSM networks is significant it has been designed to prevent the interception of information over the air interface.

The GSM security algorithms A3, A5 and A8 are used to provide authentication and radio link privacy to users on a GSM network. Generally the Subscriber Identity Module (SIM) card based A3 and A8 algorithms are implemented together (known as the A3/A8 algorithm). The A3/A8 encryption algorithm output is used by the GSM network to both authenticate the user and to generate the key for encrypting voice traffic.

Both the base station (BS) and mobile station (MS) implement the A5 encryption algorithm. The A5 algorithm is designed to ensure user privacy by encrypting voice and data streams sent over the GSM radio link.

The 3GPP specification TS 55.205 *"Specification of the GSM-MILENAGE Algorithms: An example algorithm set for the GSM Authentication and Key Generation functions A3 and A8"* specifies an example, functional implementation of the GSM authentication and key generation algorithms A3 and A8.

GSM Call Flow Example

After an initial registration at a previous time by a mobile on its home network, a mobile will request network resources by communicating with the network with an uplink transmission on the Random Access (RACH) channel with a random identifier via the Aloha protocol. If the mobile is successful communicating with the wireless network the network will respond with a transmission on the downlink on the Access Grant (AGCH) channel providing information about the uplink stand alone dedicated control channel (SDCCH) instructing the mobile, identified by the random identifier the mobile provided on the uplink RACH, how to communicate with the network next. The mobile will transmit on the uplink SDCCH requesting network resources with a CM_Serv_Req message. This message will contain the temporary international mobile station identifier (TMSI) of the mobile that the network had previously assigned to the mobile when it registered. The network is now aware of the identity of the mobile because it had previously received the mobile's international mobile station identifier (IMSI) and assigned it a temporary one, i.e. the TMSI. In preparation for authenticating the mobile the BTS serving the mobile will receive a (RAND, SRES, Kc) vector from the HLR, via the MSC/VLR and BSC, for this particular mobile. The value of SRES is determined by the HLR utilizing RAND and the same A3 algorithm resident in the mobile's SIM. The value of the encryption key, Kc, results from the HLR utilizing RAND and the same A8 algorithm that the mobile utilizes and is in its SIM. The network authenticates the mobile by sending the mobile an authorization request on the downlink which will contain the random challenge RAND. The mobile will calculate SRES with RAND, cipher key Ki and the A3 algorithm in its SIM and transmit it back to the network on the uplink. If the value of SRES received from the mobile is identical to the value of SRES from the HLR/AuC the mobile is authenticated. The mobile will also calculate the encryption key, Kc, with the RAND the network provided, cipher key Ki and the same A8 algorithm in its SIM. The network will instruct the mobile to begin encrypting its transmissions with the encryption key Kc with a cipher mode command on the downlink. Similarly the network, specifically the BTS, will also encrypt its transmissions to the mobile with the same encryption key Kc. Soon after the ciphering process begins the network will assign the mobile to a traffic channel where a phone conversation can take place.

SUMMARY

Digital wireless communications networks will utilize cryptography to authenticate mobile subscribers and encrypt the messages they send to and receive from the network on the air interface. Authentication will prevent unauthorized users from accessing the network resources and encryption keeps confidential the activities and communications that an authorized user makes. Occasionally, there is a need by law enforcement officials to monitor the activities and communications of specific subscribers by receiving the over-the-air signals between the target mobile and the base station it is communicating with. However, this requires decryption of the signals which, in turn, requires the encryption key to decrypt the signals. The HLR generates unique encryption keys, as well as the random challenge and result of the challenge, for all of the subscribers and distributes them to the MSC/VLR. The MSC/VLR in turn distributes the encryption key to the appropriate base station where it is used to encrypt messages sent to the mobile and decrypt messages received from the mobile on the air interface.

Utilization of two passive probes will permit recovery of the encryption key permitting monitoring of all over-the-air communications between the mobile and base station as well as determining the unique identity of the mobile. A passive probe is installed on the interface between the MSC/VLR and HLR/AuC to monitor the messaging between these two entities that possess the encryption keys. Similarly, a passive over-the-air probe, i.e. a wireless network monitor (WNM), receives the transmissions from the base station to the mobile as well as from the mobile to the base station. By comparing the information received by each probe the encryption key can be determined and transmissions between the mobile and base station can be decrypted.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
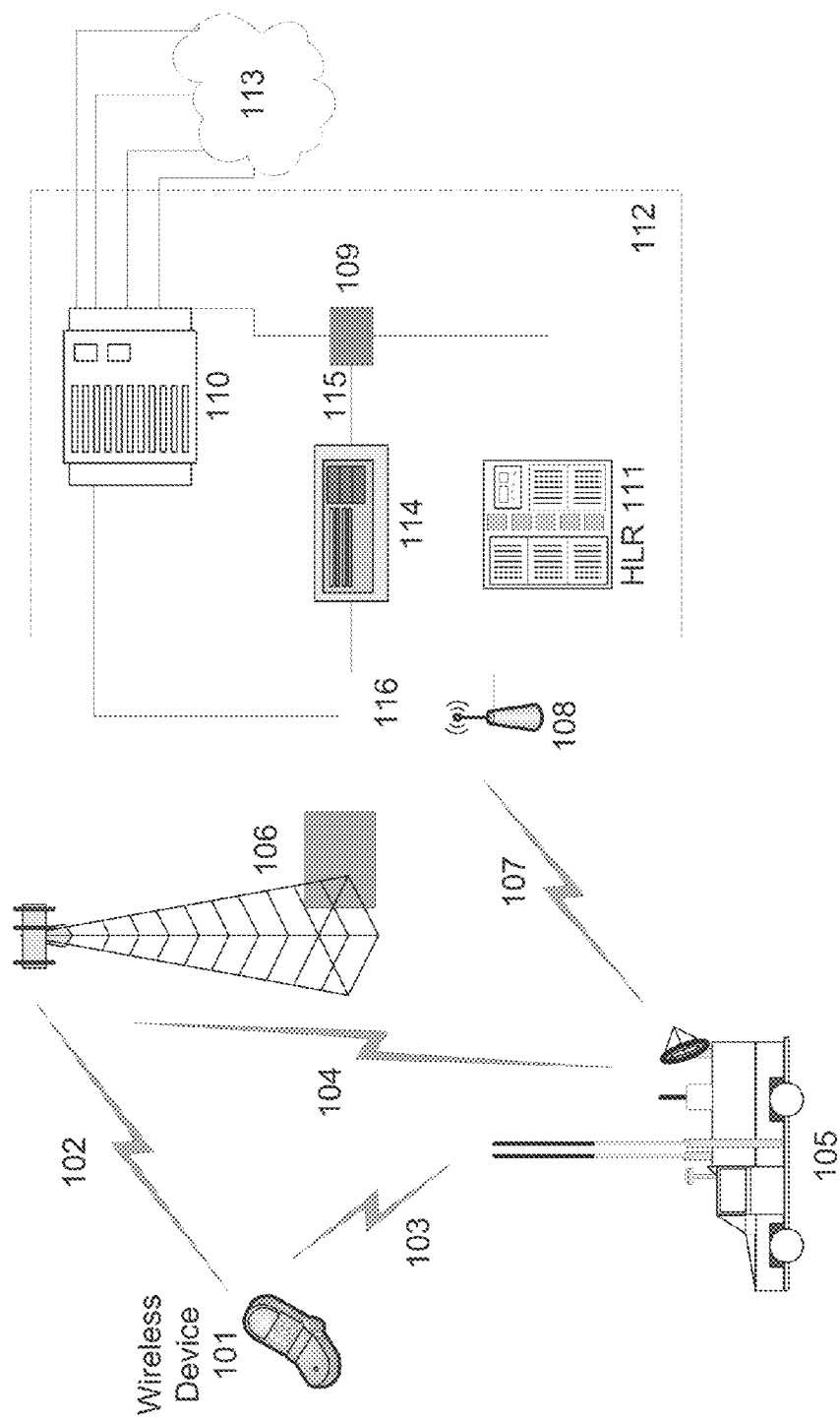
FIG. 1 shows an exemplary illustration of a small system deployment.
Figure 2:
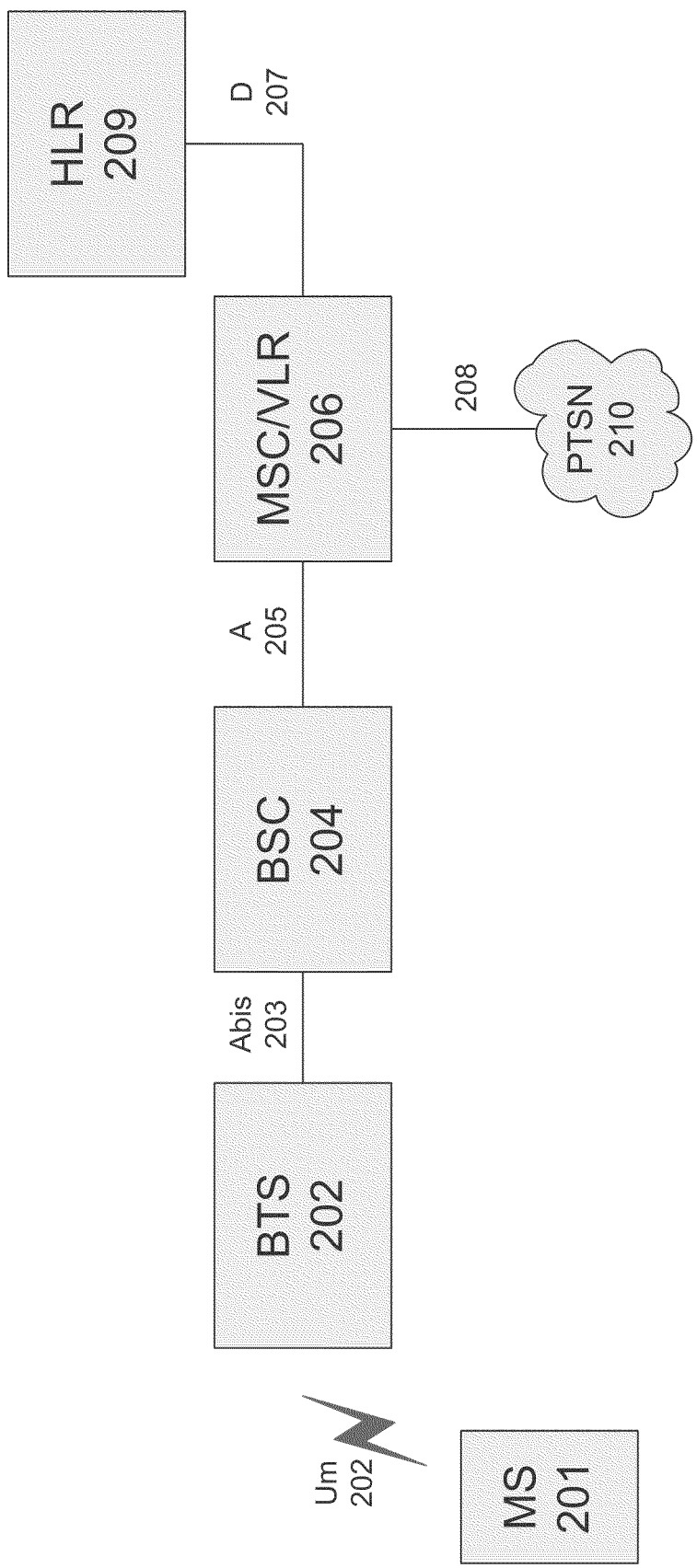
FIG. 2 illustrates the basic subsystems of a GSM wireless network including the interfaces between them.

Many digital communications networks utilize cryptography to verify their subscribers are authorized, registered subscribers, i.e. authentication, and encrypt communications between the subscribers and the network to prevent eavesdropping. Occasionally, law enforcement needs to decrypt encrypted communications so they can investigate and prevent crime. Specifically, they need to:

Determine the unique identity of the subscriber
Monitor their activity on the network
Determine the identity of who they are communicating with and who is communicating with them
Monitor the content of communications
Determine radio channel information for tasking wireless location system
Determine the physical location Fundamental to data encryption is the encryption key. Thus, for law enforcement to accomplish their tasks they need the encryption key provided to them. Digital communications networks are comprised of 1) subscribers, 2) the core communications network and 3) a subscriber database and authentication center. A digital communications network can take many forms. It can be a landline telephone network, an internet service provider, a wireless communications network and many others. The subscriber database/authentication center will possess an information vector that contains as a minimum 1) the subscriber's unique and/or temporary identity, 2) a cryptographic challenge parameter, 3) the expected challenge response to the challenge parameter and 4) the encryption key associated with the challenge parameter. Similarly, it will possess algorithms for: 1) generating the challenge response from the challenge parameter and other easily obtained parameters and 2) generating the encryption key from the challenge parameter and other easily obtained parameters. This invention comprises a means to passively monitor information flow at a minimum of two points in the digital communications network and correlate the information obtained from these two points to permit recovery of the encryption key. Correlating the challenge parameter and the challenge response at the two points in the digital communications network will yield the encryption key from point 1 in the network permitting decryption of encrypted data at point 2 in the network. The first point is the interface between the core network equipment and the subscriber database/authentication center. The second point is the interface between the subscriber(s) and the core network equipment. The first point can, alternatively, be at a place, or several places, in the digital communications network where the encryption vector can be accessed.

The well defined GSM system is an excellent example of a wireless network. In the GSM system, the identity of GSM subscribers and phones are manifested many ways. Every GSM mobile phone is assigned a unique electronic serial number at the time of manufacture known as the International Mobile Equipment Identity (IMEI) number. A GSM mobile cannot be used on any GSM wireless network without a Subscriber Identity Module (SIM) in it. The SIM is a smart card that can be physically moved between phones permitting the subscriber associated with that SIM to utilize multiple phones, although not simultaneously. The SIM contains a plethora of data but the primary pieces of information it contains is the subscriber's International Mobile Subscriber Identity (IMSI) number, its cipher key Ki and the A3, A8 and A5 algorithms. The IMSI uniquely defines the subscriber. No other subscriber in the world has the same IMSI. Once a valid SIM is inserted into a specific GSM phone it may be used on the home network that service was activated on because that subscriber information will be contained in that network's HLR. Additionally, it will be assigned a dialable number, its MS-ISDN, to permit the mobile to make and receive calls. This mobile can also make and receive calls in networks other than its home one provided its home network has a roaming agreement with the visited network.

FIG. 1

FIG. 1 illustrates reception of uplink transmissions 102 from the mobile to the wireless network base station 106 and downlink transmissions 104 from the wireless network base station 106 for reception by the mobile station. A radio network monitor (RNM) 105 is shown as deployed in a geographic area where both the uplink 102 and downlink 104 transmissions can be received. Passive Monitoring of the uplink 102 and downlink 104 transmissions by the RNM 105 allow reception of the challenge parameter and challenge response parameter at the air interface in the clear.

A network probe 109 and a correlation and decryption processor 114, shown here as co-located with the MSC 110 and the HLR 111 in a local switch facility 112, are used to passively monitor communications between the MSC 110 and HLR 111 allowing reception of the challenge parameter, challenge response parameter, encryption key and mobile identifiers. Using the information from the network probe 109 and RNM 105, the correlation and decryption processor 114 uses correlation, based on the challenge response parameter and/or mobile identifiers, to determine the current encryption key for this mobile.

The correlation and decryption processor 114 is connected to the network probe(s) 109 and the via an Ethernet LAN connection 115 and 116. The wireless data receiver 108 is connected by wireless data link (such as a GPRS or WiMAX connection) 107 to the RNM 105.

Once an encryption key has been determined by correlation it is provided to a decryption processor which will yield the original information.

This information will be of two types:
Signaling and
Content.

Signaling information is the information associated with control of the network and subscriber equipment. Wireless network information telling the network what base station can best serve a mobile subscriber is an example of signaling information. For a network-based Wireless Location System, Signaling information provides the radio channel information needed to tune the geographically distributed receivers to collect radio emissions for Time-Difference-of-arrival (TDOA), Angle of arrival (AoA), hybrid TDOA/AoA, and hybrids with handset location methods such as GNSS (Global Satellite Navigation Systems—such as GPS) or Assisted GNSS. An example of the signaling information collected for tasking of TDOA or AoA network-based wireless location can be found in 3GPP Release 7.0 Technical Specification No. 48.071, *"Location Services (LCS); Serving Mobile Location Centre—Base Station System (SMLC-BSS) interface; Layer 3 specification"* Section 4.2.12; "U-TDOA Response"

Content is the information associated with the actual communications. Emails, web pages, SMS messages and voice conversation are all examples of Content. The decrypted signaling and content information may then be monitored in real-time and/or archived in a database for subsequent analysis.

FIG. 2

The GSM Radio Air interface 201 is the Um interface specified for GSM by the European Telecommunications Standards Institute (ETSI) currently working through the 3$^{rd}$ Generation Public Partnership (3GPP). The BTS (Base Transceiver Station) 202 is the GSM-defined distributed radio point of connection for the GSM radio air interface 201 network. The BTS 202 is also responsible for encryption/decryption of data sent over the air interface.

The Abis interface 203 carries data and control information between the BTS 202 and BSC 204. The Abis interface 203 is optional as the BTS 202 and BSC 204 may be combined. The BSC (Base Station Controller) 204 handles radio resource management, such as frequency allocation and handovers, and in some cases transcoding and multiplexing tasks. The A interface 205 carries data and control information between the BSC 204 and the MSC 206.

The MSC/VLR 206 provides session and mobility management for GSM mobile devices. The MSC 206 also supports basic voice circuit switching tasks and as interface to Intelligent Networking and other SS7 network interconnected subsystems. The Visitor Location Register function of the MSC/VLR 206 is a dynamic database of user account information downloaded from various HLRs 209 for mobiles present in the area served by the MSC/VLR 206. The MSC/VLR 206 is interconnected with the HLR 209 via the "D" interface, control and data carried over an SS7-based packet data transport network.

The HLR (Home Location Register) 209 is primarily a database of user account information of a wireless carrier's customers. The user account database contains billing information, status, current/last known network address and services preferences. The AuC function, co-hosted on the HLR 209 in this example manages the encryption keys for all subscribers utilizing the network. One of the fundamental identifying pieces of information for a subscriber is its International Mobile Subscriber Identity (IMSI) number which is part of the HLR user account information as is the Mobile Station Integrated Services Digit Network Address (MS-ISDN). The IMSI is used to identify a subscriber's mobile on disparate wireless networks while the MS-ISDN is used to identify and address a subscriber from wired voice networks.

A set of Switch Circuit Trunks 208 interconnect the Public Telephone Switched Network (PTSN) 210 with the MSC 206 switching facilities, providing voice path access to other land and other wireless networks.

The Mobile Station (MS) 201 is may be a GSM-capable mobile device or may be a multi-mode GMS/GPRS/SMS voice and data mobile terminal. With the addition of the UMTS mode, the Mobile Station 201 becomes known as a UE or User Equipment.

Figures 3A, 3B:
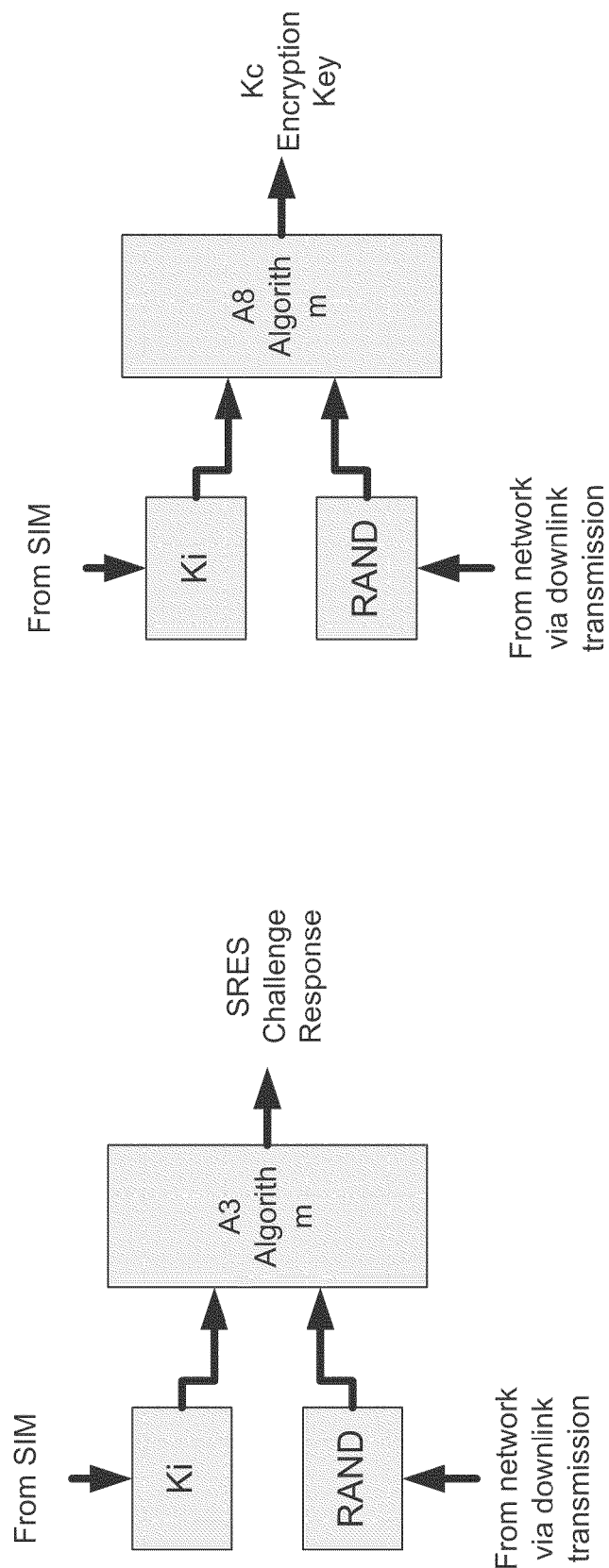
FIG. 3a illustrates the generation of the SRES Challenge Response using the A3 algorithm
FIG. 3b illustrates the generation of the Kc Encryption Key using the A8 algorithm
Figure 3C:
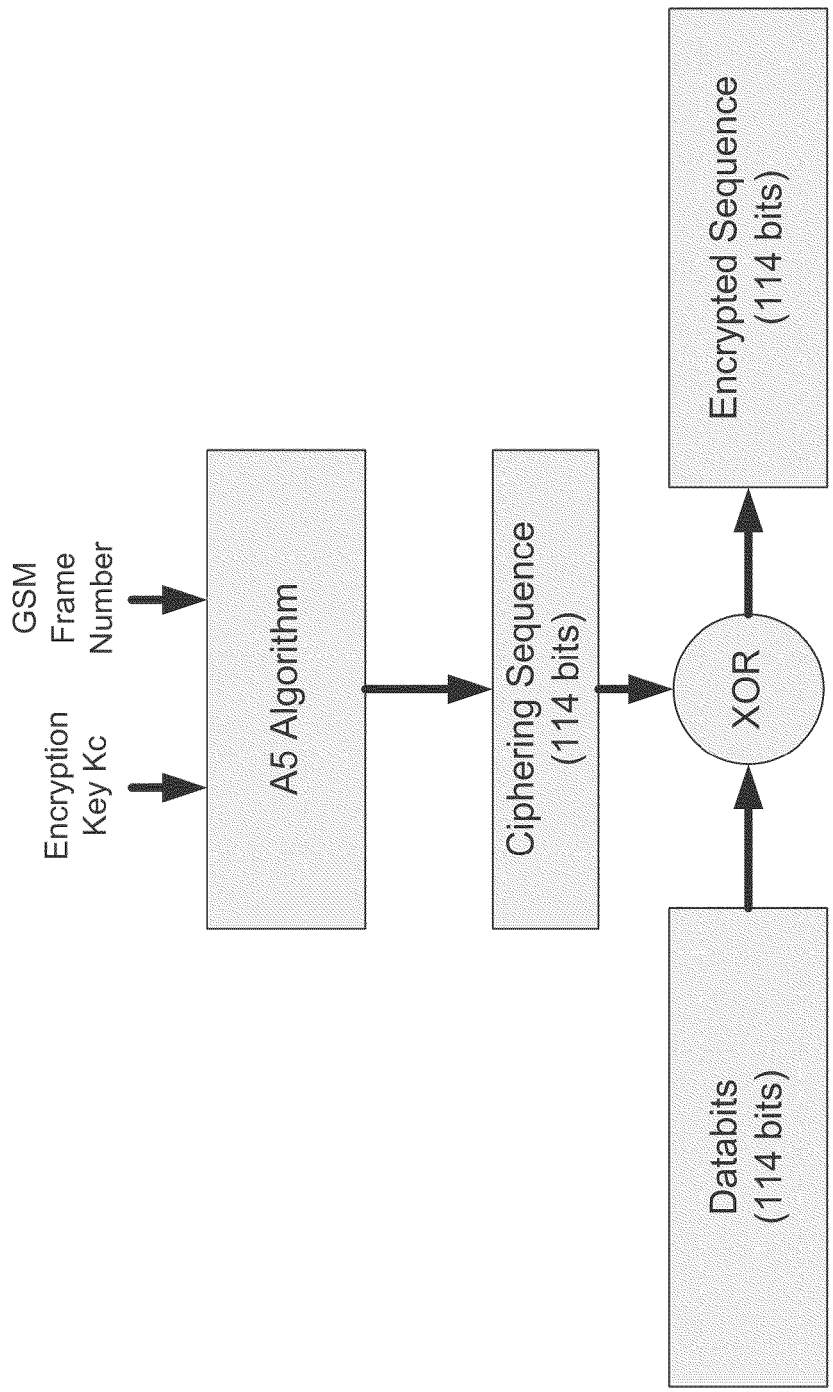
FIG. 3c illustrates the generation the cipher sequence using the A5 algorithm and the subsequent encryption of digital data to be transmitted over the radio.

FIGS. 3a, 3b and 3c

Authentication of a subscriber in a GSM network involves a challenge by the network with the RAND challenge parameter as shown in FIG. 3a. The RAND parameter is provided by the network over-the-air, in the clear to the mobile. It is processed with the cipher key, Ki, in the mobile's SIM with the A3 algorithm, also in the SIM, to get a challenge result SRES. The mobile provides SRES back to the network over-the-air in the clear and the VLR compares it to the SRES that it received from the HLR for this subscriber and if they match the subscriber is authenticated. As shown in FIG. 3b the mobile will also use the RAND that it received from the network and the Ki in its SIM to calculate and encryption key Kc with the A8 algorithm, that is in the SIM, that will be used for encrypting all remaining communications with the network. Similarly, the HLR provides the VLR the same encryption key, Kc, which is provided to the BTS to encrypt over-the-air communications to the mobile and decrypt over-the-air communications from the mobile. FIGS. 3a and 3b illustrate the process of determining SRES as well as encryption key Kc from the RAND challenge parameter, cipher key Ki and the A3 and A8 algorithms. GSM transmissions are encrypted on a pulse-by-pulse basis. GSM is a time-division-multiple-access system (TDMA) with 8 time slots per frame. Typically, a mobile will only transmit in one of the eight time slots of a frame and each time slot will possess a pulse of 114 bits of data. FIG. 3c illustrates the process of encrypting (and decrypting since it is a symmetric process) data that is transmitted over the air with the encryption key Kc and the GSM frame number, FN, which is readily available from the network transmissions.

FIG. 4

Figure 4:
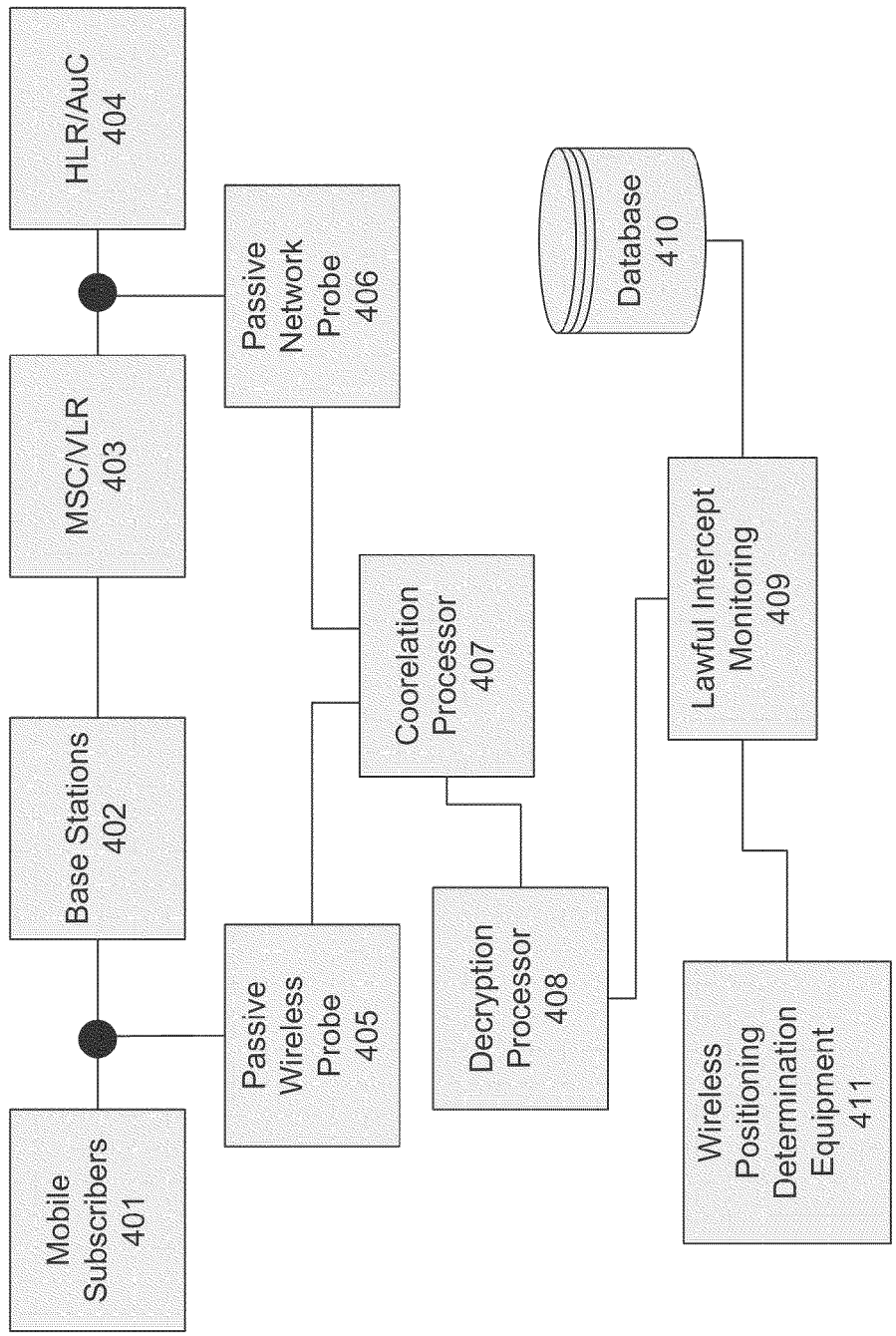
FIG. 4 illustrates the architecture of a wireless network augmented with the decryption subsystem.

FIG. 4 illustrates a manifestation of the invention applied to a digital wireless communications system. A digital wireless communications network is comprised of mobile subscribers 401 disbursed about a geographic area served by the Wireless Communications Network (WCN), base stations 402 disbursed about the service area to serve the mobile subscribers 401, mobile switching centers and visitor location registers 403 controlling access to the wireless network and providing an interface to the landline public switched telephone network (PSTN) and home location registers and authentication centers 404 for storing authorized subscriber information and cryptographic information. A passive network probe 406 is attached to the bidirectional interface between the MSC/VLR and HLR/AuC and provides information to the correlation processor with respect to the mobile's identity, the current challenge parameter, the current challenge response and the encryption key associated with the challenge parameter, i.e. the encryption vector. A passive wireless probe 405 monitors radio transmissions over the air between mobile subscribers 401 and one or more base stations 402 and provides information to the correlation processor 407 regarding the mobile's location (cell, sector, channel) and the mobile's identity, unique or temporary, the challenge parameter provided by the network to the mobile and the challenge response provided by the mobile to the network. The correlation processor 407 will compare this information with encryption vectors it has received from the other passive probe(s) for numerous mobiles and determines the current encryption key utilized between the mobile-of-interest (MOI) and wireless network. The key for the MOI will be provided to the decryption processor 408 that will decrypt encrypted transmissions between the mobile and the network and provide this information to the Lawful Intercept Monitoring System (LIMS) 409 and Database 410. The LIMS 409 will also 1) monitor signaling events in real-time, and/or archive them for subsequent analysis, to determine what the MOI is doing, who the MOI is communicating with and who is communicating with the MOI as well as a plethora of other information regarding the MOI's activities, 2) monitor the content of communications between the MOI and whom he is communicating with. These communications would include voice conversations, emails, SMS messages, and many other forms and 3) provide information to wireless position determining equipment (WPDE) 411 to determine the physical location of the mobile within the geographic coverage area of the wireless network.

FIG. 5

Figure 5:
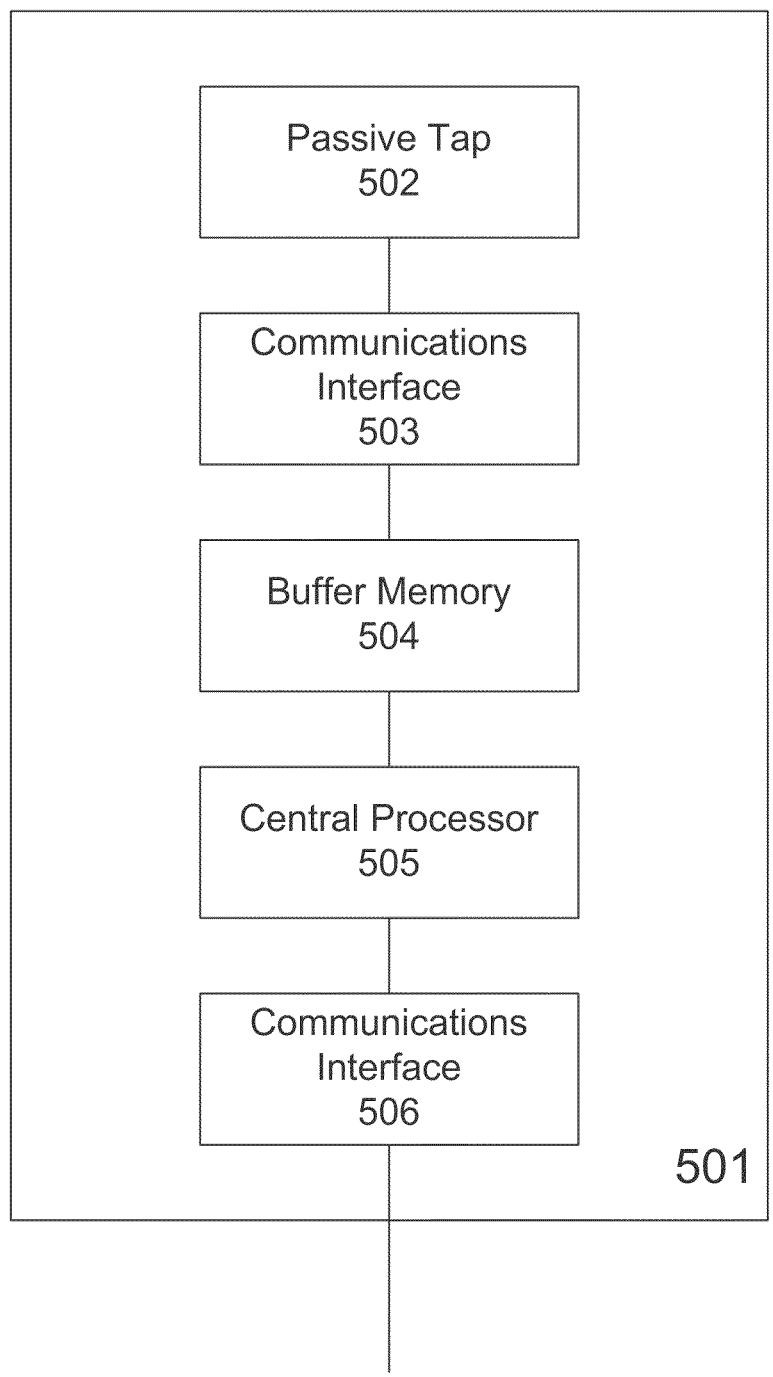
FIG. 5 details an example architecture for the passive network probe.

An illustrative block diagram of an example passive network probe system is shown in FIG. 5. This example of the passive network probe 501 comprises a passive tap 502 for obtaining a replica of the signal voltages on the interface (such as the MSC-to-HLR "D" interface in GSM networks) that it is monitoring. The passive tapping can be accomplished by insertion of another device external to the passive probe such as a digital access cross connect (DACS) in which case the signals to be probed interface directly with the inbound communications interface 503 of the passive network probe 501. A buffer memory 504 buffers the signals tapped and the central processor 505 parses just the signals that it requires and passes them out the outbound communications interface 506 which connects to the correlation processor (not shown).

FIG. 6

Figure 6:
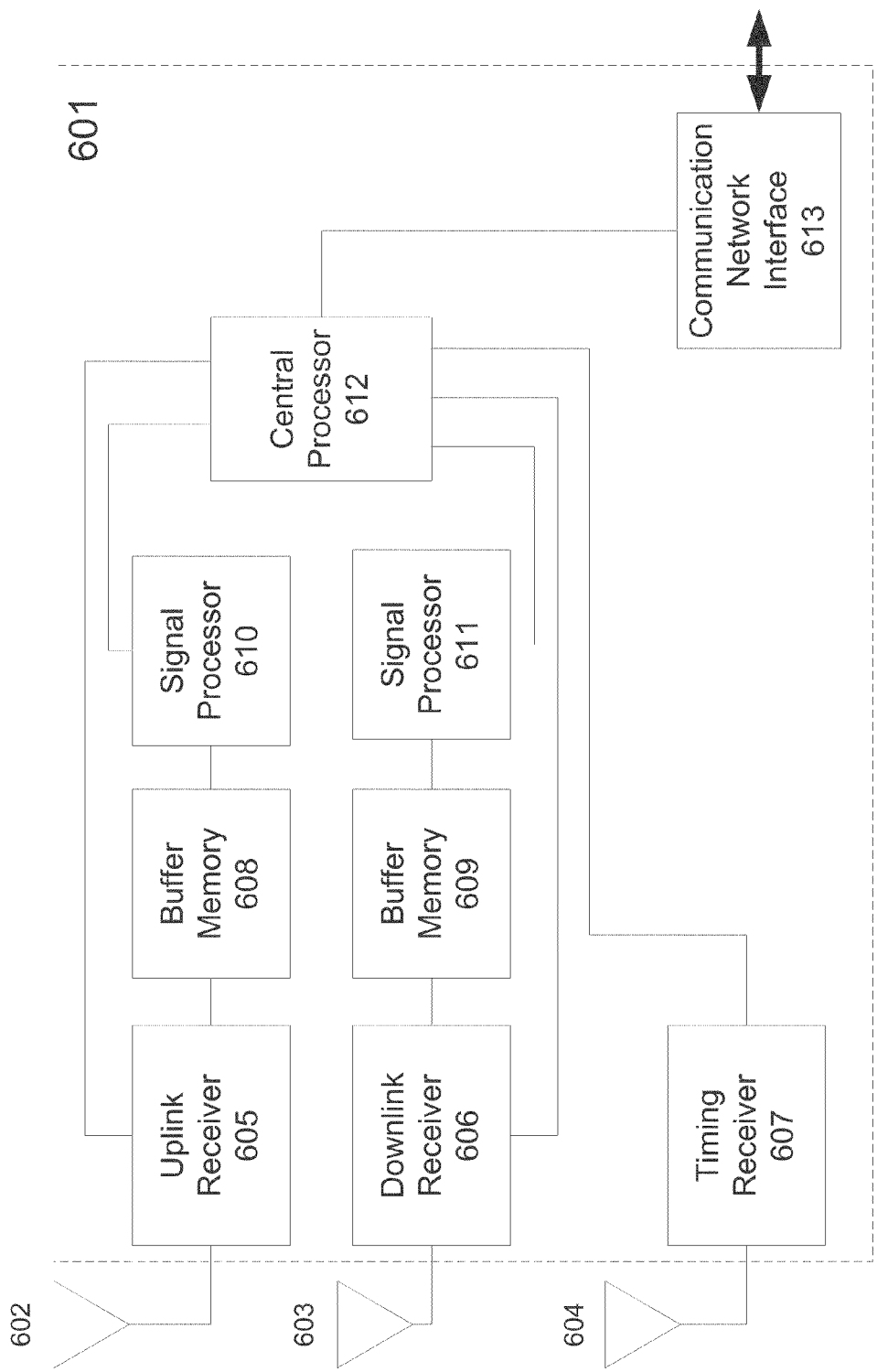
FIG. 6 details an example architecture for the passive radio probe.

For wireless communications networks a radio network monitor (RNM), or network of radio network monitors, acts as the passive probe of the uplink and downlink radio transmissions. A functional block diagram of the RNM 601 is shown in FIG. 6. The RNM 601 is comprised of digital uplink 605 and digital downlink 606 radio receiver(s) that can be tuned to the appropriate bands of interest. The digital output of the uplink 605 and downlink receivers 606 interface to buffer memory 608 609 which will store the signals to accommodate for any latency in determining the encryption key. The signals from the buffer memory, or directly from the receivers, are input to the signal processors 610 611. The signal processors 610 611 perform many digital signal processing functions on the signals such as in-phase and quadrature detection, downconversion to baseband, filtering, fine tuning and detection and demodulation of the received signals for recovery of the parameters that will be correlated with in the correlation processor to derive the encryption key. The signal processors 610 611 may also decrypt the encrypted signals with the encryption key from the correlation processor. A timing receiver 607 (such as a GNSS timing receiver) provides a time and frequency reference as well as the physical location of the RNM as latitude and longitude values. A control processor 612 coordinates the resources of the RNM and interfaces to the communications network interface 613. The communications network interface 613 facilitates communications with the correlation processor (not shown) and other network components.

FIG. 7

Figure 7:
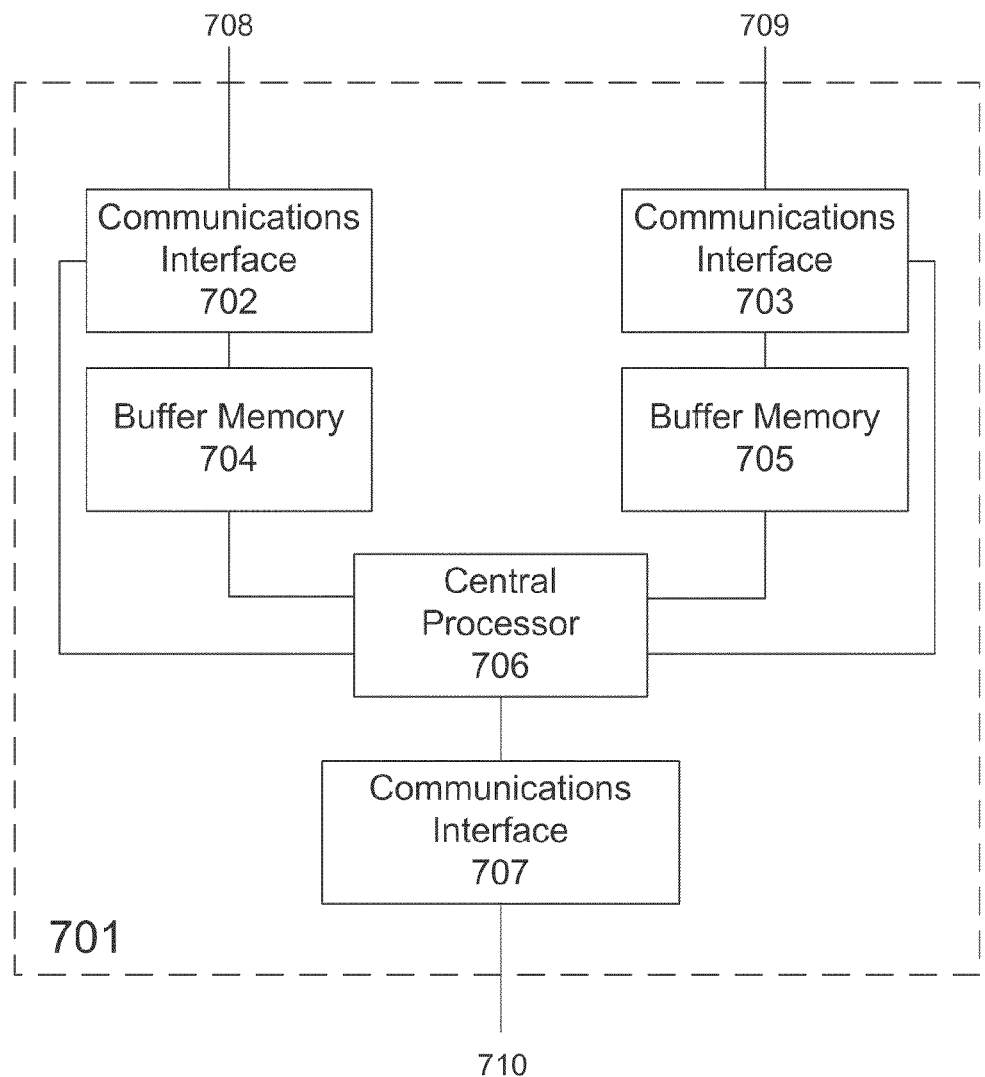
FIG. 7 illustrates an architecture for a correlation processor.

FIG. 7 details an architecture for the correlation processor which associates the inputs from the network probe and the radio probe subsystems to determine the current encryption key and other information such as rough location and radio channel information for a specific mobile.

The Correlation Processor 701 supports multiple digital datalinks 708 709 that interconnect the CP 701 with the deployed probe systems (not shown). For each probe type (in this example, network and wireless, a separate communications interface 702 703 is instantiated in the CP 701 allowing for differing interface types to be used.

Each independent communications interface 702 703 has an associated Buffer Memory 704 705 which allows for independent data flow rates, drop-outs and retries to be tolerated. The central processor 706 takes the data from each communications source 708 709 and then compares the challenge response parameter or both the challenge parameter and the challenge response parameter to find the encryption vector with the parameter(s) which yields the current encryption key. The encryption vector will contain as a minimum the challenge response parameter and the encryption key for each mobile.

The central processor 706 will also provide the unique identity and/or temporary identity of the mobile as well as other information such as cellular location (cell/sector/timing advance/power ranging) and channel information for tuning of network-based Wireless Location System receivers.

The central processor 706 will then use the outward bound communications interface 707 to deliver the encryption key, and other information, to the decryption processor as well as the LIMS.

FIG. 8

Figure 8:
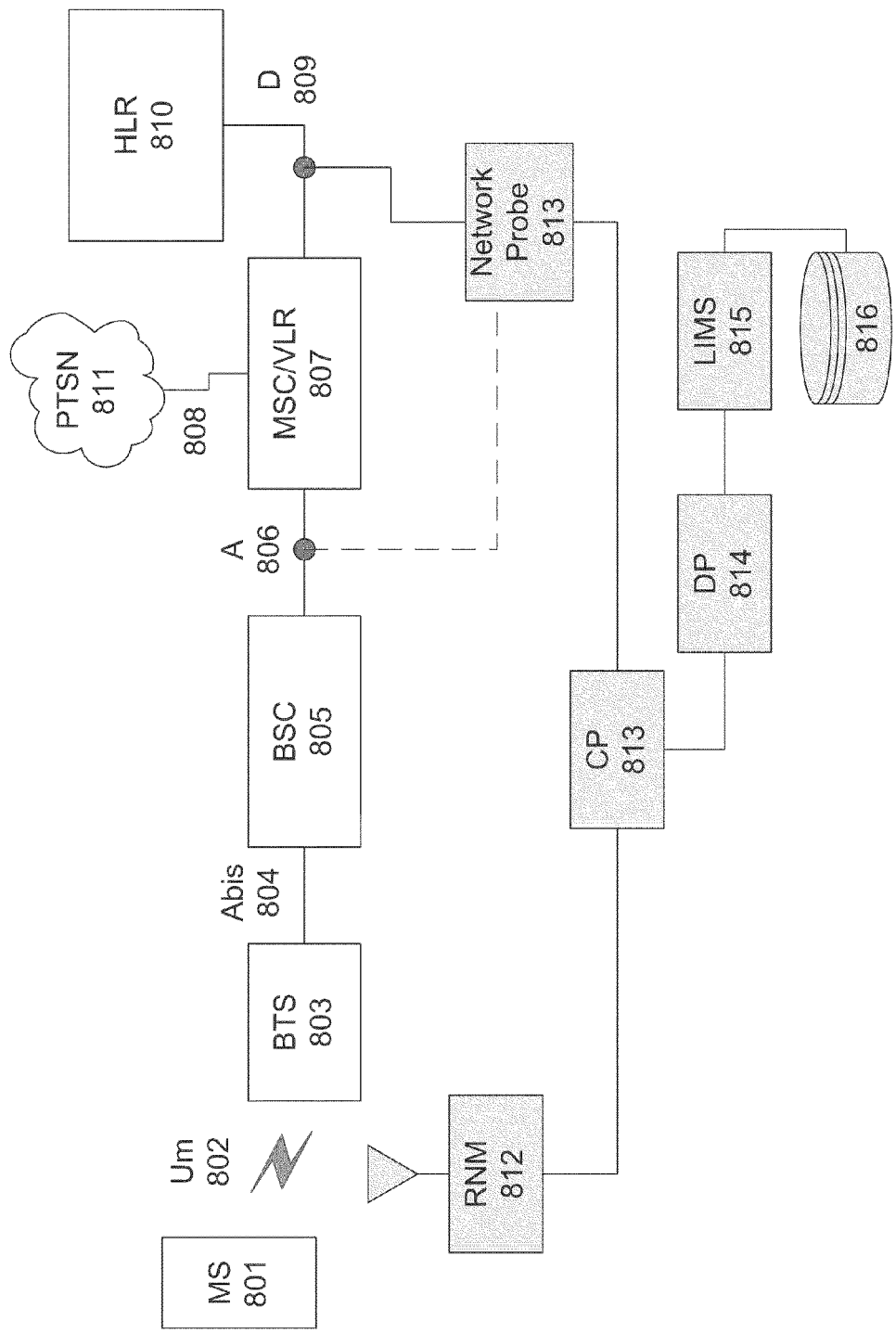
FIG. 8 illustrates probe points and parameters for a GSM wireless network.

FIG. 8 shows the functional components of the passive key determination system as deployed with the GSM example network.

The MS 801, Um interface 802, BTS 803, Abis Interface 804, BSC 805, A interface 806, the MSC/VLR 807, the switched circuit trunks 808, the PTSN 811, the D interface 809 and the HLR/AuC 810 are all as described in the GSM specifications.

The Radio Network Monitor (RNM) 812 provides for uplink and downlink monitoring of the GSM radio air interface 802. The RNM 812 allows measurement of RAND, the challenge parameter, from downlink transmissions 803 from the BTS 803 to the mobile on the radio air interface 802 in the clear in GSM and measurement of SRES, the challenge response, from uplink transmissions from the mobile 801 to the BTS 803. The TMSI is also measured in the clear on the uplink 802 radio transmission. Cellular location and channel information is also obtained via the RNM 812.

The network Probe 813 monitors the D interface 809 to measure encryption vectors RAND, SRES and the encryption key Kc. The IMSI and MS-ISDN are obtained via the Network Probe 813. Mobile country code, network codes and system code, allowing for very approximate location, are obtained from the network Probe 813.

The correlation processor 814 determines by mobile identifiers, collection time stamps and location information, the association of the RAND and SRES collected from the air interface 802 with RAND and SRES obtained from the D interface 809 to determine the current encryption key, Kc, for the mobile. Alternately, correlating only the SRES for the air interface with the SRES from the D interface 809 is sufficient for determining the current Kc for the mobile. The CP 814 passes the key, Kc, to the Decryption Processor 815.

The decryption processor (DP) 815 utilizes the encryption key provided by the correlation processor 814 to decrypt encrypted information. The DP 815 may be part of the RNM 812, CP 814 or a standalone unit. The DP 815 provides decryption keys or decrypted information to the LIMS 816 which may also be part of the RNM 813. The decryption processor 815 also possesses the ability to provide unencrypted information to the LIMS 816 from the RNM 813.

The Lawful Intercept Monitoring System (LIMS) 816 and Database 817 accepts information from both the RNM 812 and the decryption processor 815. This information can be stored in a database for forensic analysis at a later date or it can be used in real-time. A user interface is provided by the LIMS 816 for control. It has an application to assist in forensic analysis of information in the database as well as display that information. It also provides for the capability to trigger wireless position determining equipment to determine the location of a MOI as well as accept this location equipment and display it on a map or similar GIS system or store it in the database.

The A interfaces 806 in the GSM network may provide an alternate probe point(s) should the D interface 809 not be available for probing. Since multiple BSC's 805, possibly geographically separated, are normally supported by a single MSC/VLR cluster 807, additional network probes 813 installations are expected to be required over D interface 809 monitoring.

FIG. 9

Figure 9:
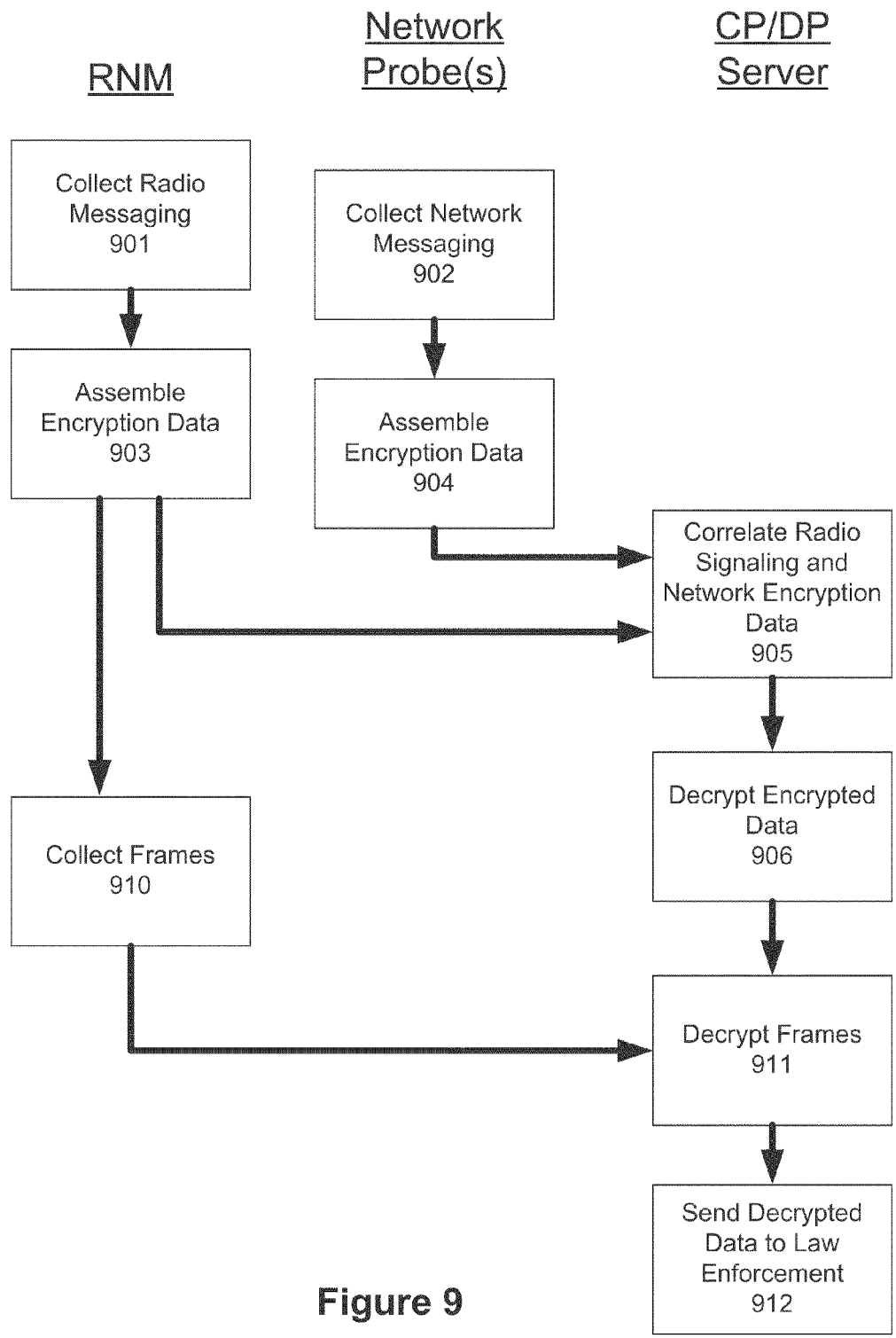
FIG. 9 illustrates probe points and parameters for a UMTS wireless network.

FIG. 9 is used to demonstrate the operation of the passive key determination system.

The collection of radio air interface data 901 via the RNM is accomplished in parallel with the collection of network messaging 902. These operations 901 902 occur continuously over the window of operation. The RNM filters the received information to assemble the encryption parameters (and radio channel information) and the available mobile identifiers sent over the uplink or downlink radio transmissions between the base station and mobile station 903. The network probe system filters the received information set between the MSC/VLR and HLR/AuC to assemble the encryption parameters and the available mobile identifiers. The encryption parameters, time of collection, mobile identifiers (such as TMIS, IMSI, IMEI, MS-ISDN), radio channel information, cellular network locators (such as cell, sector, timing measurements, power measurements, country, network, system) are passed to the Correlation Processor (CP) which correlates the data sets to determine the encryption key, Kc. The Kc key is passed to the Decryption Processor (DP) and data related to the identified mobile collected by the RNM or Network can then be decrypted 906. The RNM can feed received versions of the encrypted uplink and downlink transmission frames to the DP for decryption 911. The decrypted data can then be passed to law enforcement for monitoring and databasing 912.

FIG. 10

Figure 10:
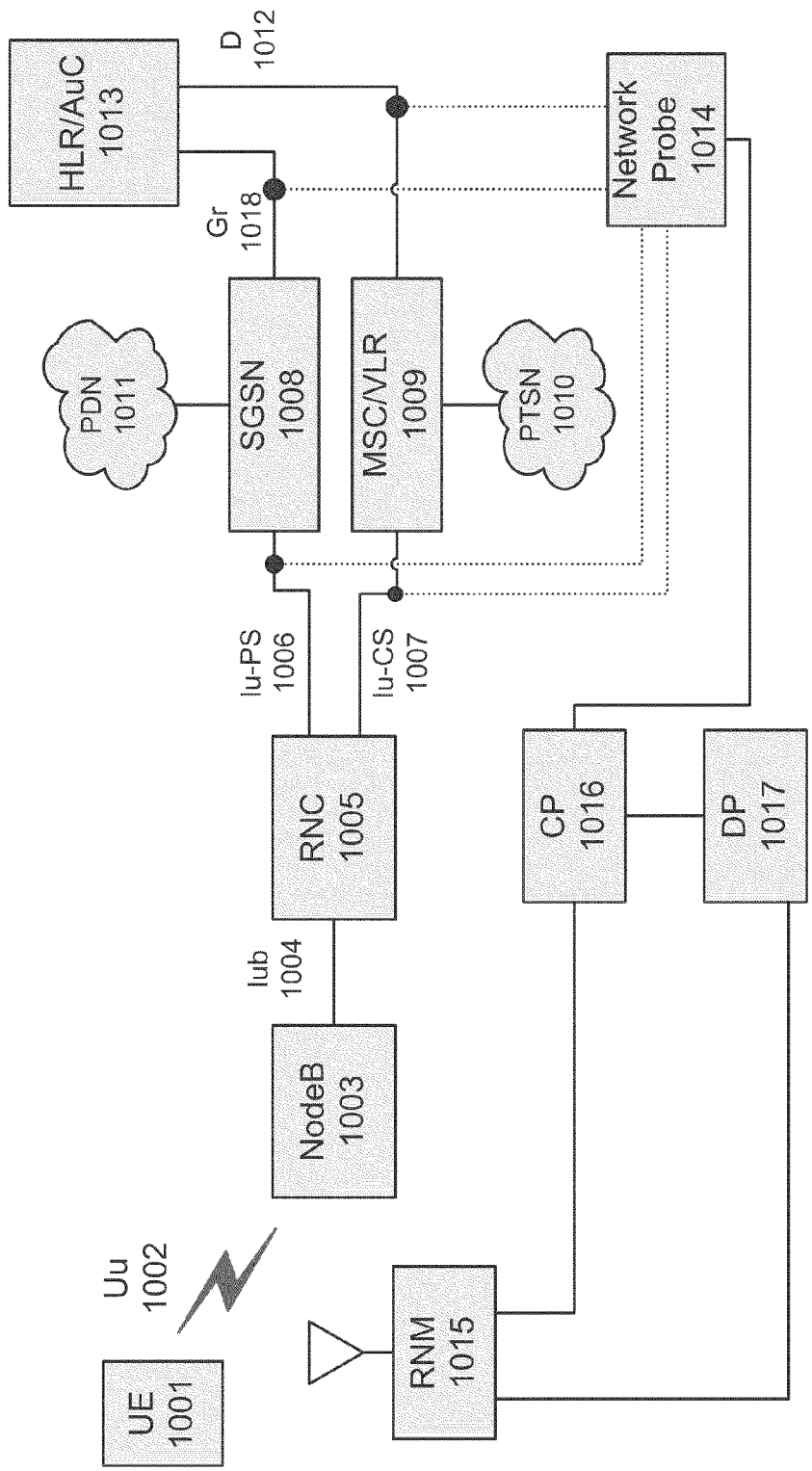
FIG. 10 illustrates an embodiment in a UMTS wireless network.

FIG. 10 illustrates the inventive concept for a UMTS wireless network. The UMTS wireless network is comprised of Node Bs 1003, RNCs 1005, MSC/VLR 1009, and HLR/AuC 1013 for circuit switched calls. The Iub 1004 interface connects the Node Bs 1003 and RNC 1005, the Iu-CS 1007 interface connects the RNCs 1005 to the MSC/VLR 1009 and the D interface 1012 connects the MSC/VLR 1009 to the HLR/AuC 1013. For packet switched data the RNC 1005 is connected to the SGSN through the Iu-PS interface and the Gr interface connects the SGSN to the HLR/AuC. The RAND, XRES, AUTN and TMSI are measured on the air interface by the RNM 1015. Similarly, RAND, XRES, AUTN, encryption key CK, IK and IMSI MS-ISDN identity parameters are passively monitored by the Network Probe 1014 at the D interface 1012. The RAND, XRES, AUTN and TMSI from the RNM 1015 and the RAND, XRES, AUTN, encryption key CK, IK and IMSI MS-ISDN from the Network Probe 1014 are passed to the CP 1016 for correlation to determine the current CK for the mobile-of-interest.

The Ck is passed to the DP 1017 allowing for decryption of uplink or downlink radio messaging collected by the RNM 1015.

Alternate network probe points within the network include the Iu-CS 1007, Iu-PS 1006 and the Gr 1018 interfaces.

FIG. 11

Figure 11:
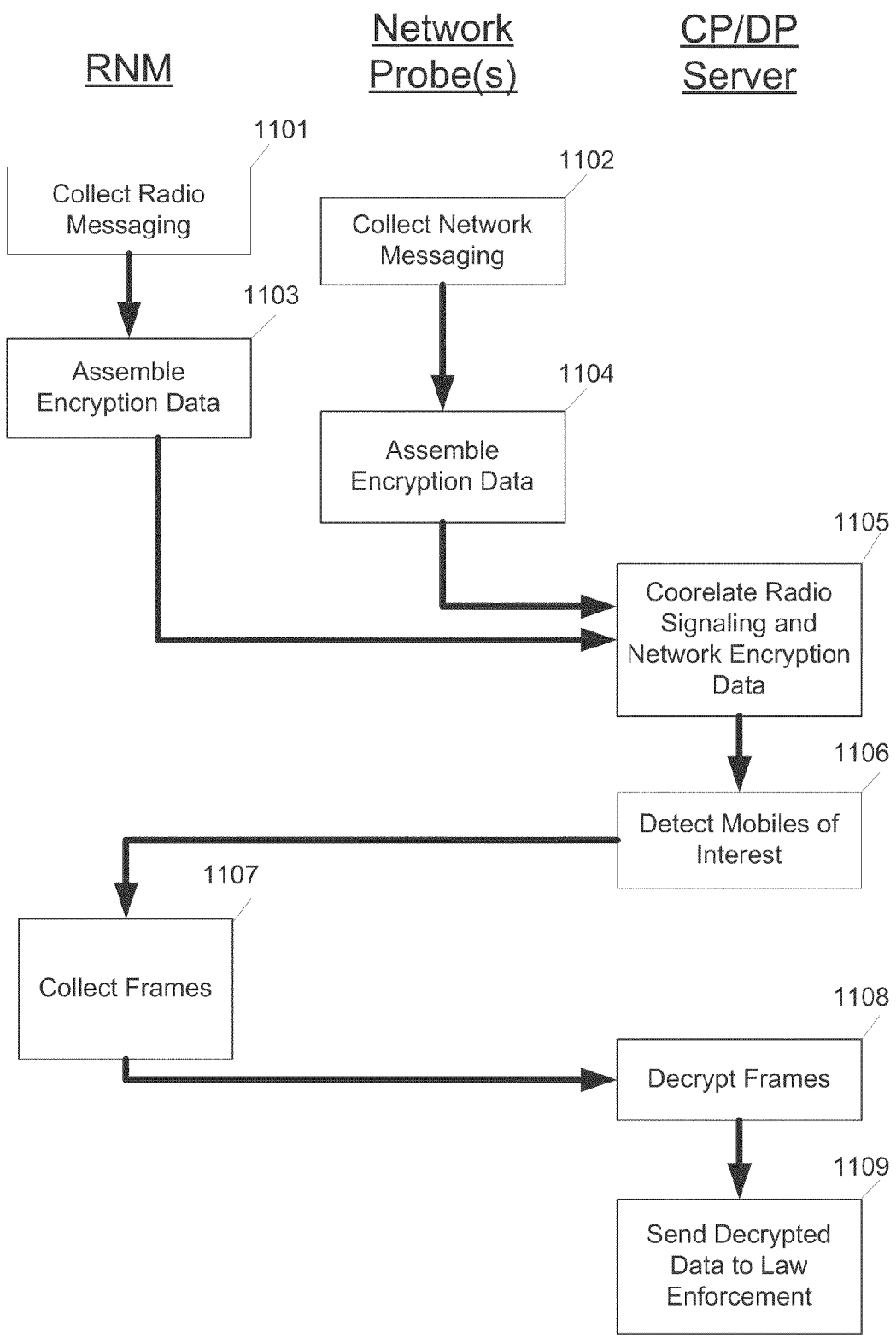
FIG. 11 illustrates an inventive procedure for signal collection to determine an encryption key and monitoring of a call.

FIG. 11 shows a high level procedure of a signal collection to determine the encryption key and then monitoring of the call.

The radio messaging is monitored for in the clear (non-encrypted) messaging which includes encryption key related data 1101 while the network is also monitored for encryption key related data 1102. The encryption key related data is assembled 1103 1104 and delivered to the CP/DP server for correlation of delivered data collected from the radio and network interfaces 1105. For mobiles of interest (detected by the mobile identifier(s)) 1106, encrypted radio signaling is collected 1107 and sent to the CP/DP server for decryption 1108. The now decrypted voice is then passed to law enforcement 1109.

Conclusion

The true scope the present invention is not limited to the presently preferred or illustrative embodiments disclosed herein. As will be understood by those skilled in the art, many of the inventive aspects disclosed herein may be applied in location or wireless communications systems that are based on different technical specifications as may be developed in the future. The functional components described herein are, in essence, programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements described herein to another functional element without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

I claim:

1. A system for use in collecting and decrypting encrypted wireless signals in a wireless communications network (WCN), comprising:
    a first passive probe installed on a first interface and configured to monitor messaging possessing encryption keys;
    a second passive probe, wherein the second passive probe comprises a wireless network monitor (WNM) configured to monitor transmissions between a WCN base station and a mobile device; and
    a correlation processor operatively coupled to the first and second probes and configured to compare information received by each probe and to determine the encryption key as a result of the comparison, wherein the encryption key is useful to decrypt transmissions between the mobile device and the WCN base station;
    wherein the correlation processor is configured to compare a challenge parameter and a challenge response parameter, and to find an encryption vector with the same challenge parameter and challenge response parameter, wherein the encryption vector contains the challenge parameter, the challenge response parameter and the encryption key for the mobile device.

2. A system as recited in claim 1, wherein said first interface is between a mobile switching center (MSC) or visitor location register (VLR) and a home location register (HLR) or authentication center (AuC).

3. A system as recited in claim 1, wherein the system is configured to determine encryption keys of the WCN in accordance with at least one of: Global System for Mobility (GSM), Universal Mobile Telephone System (UMTS), and Long Term Evolution (LTE).

4. A system as recited in claim 1, wherein the first passive probe comprises a passive tap for obtaining a replica of signal voltages on the first interface; a buffer memory for buffering replica signals; a central processor; and an outbound communications interface; wherein the central processor is configured to parse signals and pass them out through the outbound communications interface to the correlation processor.

5. A system as recited in claim 4, wherein the passive tap comprises a digital access and cross-connect system (DACS).

6. A system as recited in claim 1, wherein the second passive probe comprises a radio network monitor (RNM).

7. A system as recited in claim 6, wherein the RNM comprises:
    a digital uplink receiver and a digital downlink receiver;
    buffer memory coupled to each of the digital uplink and downlink receivers, wherein digital outputs of the uplink and downlink receivers interface to the buffer memory for storage of signals to accommodate for latency in determining the encryption key; and
    first and second signal processors coupled to the buffer memory, wherein at least one of the signal processors performs digital signal processing functions on the uplink and downlink signals received, said functions including at least in-phase and quadrature detection, down-conversion to baseband, filtering, fine tuning, detection and demodulation of the received signals for recovery of parameters for use in correlation in the correlation processor.

8. A system as recited in claim 7, wherein at least one of the signal processors further performs decryption of encrypted signals with the encryption key from the correlation processor.

9. A system as recited in claim 7, wherein the RNM further comprises a timing receiver configured to provide a time and frequency reference as well as the location of the RNM as latitude and longitude values.

10. A system as recited in claim 1, wherein the correlation processor comprises:
    a first communications interface;
    a first buffer memory coupled to the first communications interface;
    a second communications interface;
    a second buffer memory coupled to the second communications interface;
    a central processor coupled to the first and second buffer memories; and
    a third communications interface coupled to the central processor;
    wherein the correlation processor is configured to: receive signals from the first passive probe via the first communications interface; receive signals from the second passive probe via the second communications interface; and based on the received signals, determine a current encryption key for the mobile device.

11. A system as recited in claim 10, wherein the correlation processor is configured to take data from each buffer memory, to compare a challenge parameter and a challenge response parameter, and to find an encryption vector with the same challenge parameter and challenge response parameter, wherein the encryption vector contains the challenge parameter, the challenge response parameter and the encryption key for the mobile device.

12. A system as recited in claim 11, wherein the central processor is further configured to provide at least one of a unique identity and a temporary identity of the mobile device.

13. A system as recited in claim 10, wherein the correlation processor is configured to take data from each buffer memory, to compare a challenge response parameter, and to find an encryption vector with the same challenge response parameter, wherein the encryption vector contains the challenge parameter, the challenge response parameter and the encryption key for the mobile device.

14. A system as recited in claim 13, wherein the central processor is further configured to provide information including cellular location and channel information for tuning of network-based wireless location system receivers.

15. A system as recited in claim 1, wherein:
the first interface is between a mobile switching center (MSC) or visitor location register (VLR) and a home location register (HLR) or authentication center (AuC);
the system is configured to determine encryption keys of the WCN in accordance with at least one of: Global System for Mobility (GSM), Universal Mobile Telephone System (UMTS), and Long Term Evolution (LTE);
the first passive probe comprises a passive tap for obtaining a replica of signal voltages on the first interface; a buffer memory for buffering replica signals; a central processor; and an outbound communications interface; wherein the central processor is configured to parse signals and pass them out through the outbound communications interface to the correlation processor; and wherein the passive tap comprises a digital access and cross-connect system (DACS) external to the first passive probe;
the second passive probe comprises a radio network monitor (RNM), and wherein the RNM comprises: a digital uplink receiver and a digital downlink receiver; buffer memory coupled to each of the digital uplink and downlink receivers, wherein digital outputs of the uplink and downlink receivers interface to the buffer memory for storage of signals to accommodate for latency in determining the encryption key; and first and second signal processors coupled to the buffer memory, wherein at least one of the signal processors performs digital signal processing functions on the uplink and downlink signals received, said functions including at least in-phase and quadrature detection, down-conversion to baseband, filtering, fine tuning, detection and demodulation of the received signals for recovery of parameters for use in correlation in the correlation processor; and wherein at least one of the signal processors further performs decryption of encrypted signals with the encryption key from the correlation processor; and wherein the RNM further comprises a timing receiver configured to provide a time and frequency reference as well as the location of the RNM as latitude and longitude values; and
the correlation processor comprises: a first communications interface; a first buffer memory coupled to the first communications interface; a second communications interface; a second buffer memory coupled to the second communications interface; a central processor coupled to the first and second buffer memories; and a third communications interface coupled to the central processor; wherein the correlation processor is configured to: receive signals from the first passive probe via the first communications interface; receive signals from the second passive probe via the second communications interface; and based on the received signals, determine a current encryption key for the mobile device; and wherein the correlation processor is configured to take data from each buffer memory, to compare a challenge parameter and a challenge response parameter, and to find an encryption vector with the same challenge parameter and challenge response parameter, wherein the encryption vector contains the challenge parameter, the challenge response parameter and the encryption key for the mobile device; wherein the central processor is further configured to provide at least one of a unique identity and temporary identity of the mobile device; and wherein the central processor is further configured to provide information including cellular location and channel information for tuning of network-based wireless location system receivers.

16. A system as recited in claim 1, wherein:
the first interface is between a mobile switching center (MSC) or visitor location register (VLR) and a home location register (HLR) or authentication center (AuC);
the system is configured to determine encryption keys of the WCN in accordance with at least one of: Global System for Mobility (GSM), Universal Mobile Telephone System (UMTS), and Long Term Evolution (LTE);
the first passive probe comprises a passive tap for obtaining a replica of signal voltages on the first interface; a buffer memory for buffering replica signals; a central processor; and an outbound communications interface; wherein the central processor is configured to parse signals and pass them out through the outbound communications interface to the correlation processor; and wherein the passive tap comprises a digital access and cross-connect system (DACS) external to the first passive probe;
the second passive probe comprises a radio network monitor (RNM), and wherein the RNM comprises: a digital uplink receiver and a digital downlink receiver; buffer memory coupled to each of the digital uplink and downlink receivers, wherein digital outputs of the uplink and downlink receivers interface to the buffer memory for storage of signals to accommodate for latency in determining the encryption key; and first and second signal processors coupled to the buffer memory, wherein at least one of the signal processors performs digital signal processing functions on the uplink and downlink signals received, said functions including at least in-phase and quadrature detection, down-conversion to baseband, filtering, fine tuning, detection and demodulation of the received signals for recovery of parameters for use in correlation in the correlation processor; and wherein at least one of the signal processors further performs decryption of encrypted signals with the encryption key from the correlation processor; and wherein the RNM further comprises a timing receiver configured to provide a time and frequency reference as well as the location of the RNM as latitude and longitude values; and
the correlation processor comprises: a first communications interface; a first buffer memory coupled to the first communications interface; a second communications interface; a second buffer memory coupled to the second communications interface; a central processor coupled to the first and second buffer memories; and a third communications interface coupled to the central processor; wherein the correlation processor is configured to: receive signals from the first passive probe via the first communications interface; receive signals from the second passive probe via the second communications interface; and based on the received signals, determine a current encryption key for the mobile device; and wherein the correlation processor is configured to take data from each buffer memory, to compare a challenge response parameter, and to find an encryption vector with the same challenge response parameter, wherein the encryption vector contains the challenge response parameter and the encryption key for the mobile device; wherein the central processor is further configured to provide at least one of a unique identity and temporary identity of the mobile device; and wherein the central processor is further configured to provide information including cellular location and channel information for tuning of network-based wireless location system receivers.

* * * * *